United States Patent [19]
Semenenko et al.

[11] Patent Number: 5,351,864
[45] Date of Patent: Oct. 4, 1994

[54] APPARATUS FOR TRANSFERRING FLOWABLE MATERIAL TO A RECEPTACLE AND SYSTEM INCORPORATING THE SAME

[75] Inventors: Ivan Semenenko, Moreton-In-Marsh, England; Glenn Selch, Boulder, Colo.

[73] Assignee: Matcon Limited, Gloucestershire, United Kingdom

[21] Appl. No.: 990,855

[22] Filed: Dec. 14, 1992

[30] Foreign Application Priority Data

Dec. 16, 1991 [GB] United Kingdom ............... 9126664

[51] Int. Cl.⁵ .............................................. B67D 3/00
[52] U.S. Cl. ................................. 222/504; 141/346; 141/349
[58] Field of Search ............... 222/1, 53, 185, 199, 222/460, 504, 509, 559, 563; 141/312, 346, 348, 349

[56] References Cited

U.S. PATENT DOCUMENTS

| | | | |
|---|---|---|---|
| 3,971,493 | 7/1976 | Williams | 222/185 |
| 4,077,182 | 3/1978 | Papaluca | 53/109 |
| 4,691,843 | 9/1987 | Dunan | 222/199 X |
| 5,036,894 | 8/1991 | Semenenko | 141/346 |
| 5,125,438 | 6/1992 | McCunn et al. | 141/349 X |

FOREIGN PATENT DOCUMENTS

| | | |
|---|---|---|
| 0297494 | 1/1989 | European Pat. Off. . |
| 0362501 | 4/1990 | European Pat. Off. . |
| 0380255 | 8/1990 | European Pat. Off. . |
| 0384826 | 8/1990 | European Pat. Off. . |
| 0446790 | 9/1991 | European Pat. Off. . |
| 1188882 | 3/1965 | Fed. Rep. of Germany . |
| 2640598 | 6/1990 | France . |
| 1184679 | 3/1970 | United Kingdom . |
| 2058729 | 4/1981 | United Kingdom . |
| 2212788 | 8/1989 | United Kingdom . |

Primary Examiner—Gregory L. Huson
Attorney, Agent, or Firm—Shapiro and Shapiro

[57] ABSTRACT

The invention relates to apparatus comprising a container, such as a silo or hopper for storing and distributing flowable material, to receptacle such as an I.B.C. via an outlet, there being a device adapted for removing and replacing a closure of the receptacle, particularly on passage of material into the receptacle.

In a preferred arrangement, outlet of the silo is normally obturated by a conical (or frusto-conical) closure device which is raised and lowered by pneumatic devices in the form of an air bellows mounted in the silo on a frame. The bellows is within a cone, and there is also a device for oscillating the cone, such as a vibrator, in order to obviate bridging or rat-holing of material during discharge. The bellows is housed within a hygienic cover for cleanliness. The cone is connected with the bellows via a connector which may be in the form of a telescopic tube. The tube passes through the apex of the cone and is secured thereat as by a nut and bolt arrangement. The tube passes down interiorly of the cone and terminates in a suction cup such as a rubber cup, the cup itself being generally conical and its periphery being generally in a plane which also contains the periphery of the cone. There is a vacuum line connecting the interior of the tube, and hence the interior of the cup, with a vacuum source.

27 Claims, 2 Drawing Sheets

APPARATUS FOR TRANSFERRING FLOWABLE MATERIAL TO A RECEPTACLE AND SYSTEM INCORPORATING THE SAME

BACKGROUND OF THE INVENTION

The invention relates to apparatus for handling flowable material, and to a system incorporating same.

Containers such as bulk storage vessels, silos, hoppers and the like are often used for handling and storing flowable material such as powder or like particulate material, though the material could be a liquid, slurry or similar.

Such material is often required to be transferred from the container through an outlet thereof to a receptacle such as an intermediate bulk container (I.B.C.), for further handling. Where the material can contaminate the surrounding environment as well as the container and receptacles themselves, complicated, and thus expensive, equipment has to be utilized in removing a closure or lid of a charging aperture of the receptacle. Even where contamination is not of such import, it is still a time-consuming process to ensure correct opening (and replacing) of the lid

SUMMARY OF THE INVENTION

It is accordingly among the objects of the invention to mitigate these disadvantages.

According to one aspect of the invention there is provided apparatus comprising a container for flowable material, which is adapted for passing material to another receptacle via an outlet, comprising a device associated with the outlet for removing and replacing a closure of the receptacle on passage of material into the receptacle.

The device may be a device operable under vacuum for removing and replacing a closure of the receptacle. This provides a relatively simple way of operating, that is opening and closing the lid.

The device may be mounted internally of a means for obturating the outlet. This provides a relatively neat, compact structure.

The obturating means may comprise a cone which may be reciprocable by actuating means for obturating and opening the outlet. This provides for a positive opening and closing action.

The actuating means may comprise a pneumatic lifting means, such as, preferably, a bellows means which is relatively simple to operate.

The device may be mounted by connector means with the actuating means.

The connector means may comprise a telescopic mounting means. This provides a relatively simple way of achieving actuation of the device, which may itself comprise a suction cup mounted on one end of the telescopic mounting means.

There may be a vacuum connection with the telescopic means whereby to provide a vacuum internally of the device. This provides an efficient way of providing a suction lift.

According to a second aspect of the invention there is provided a system comprising apparatus as discussed above, and a receptacle associated therewith for receiving flowable material from the container.

The container and receptacle may include respective seal means associated with the outlet so as to seal exterior surfaces of the container and receptacle against contamination by material.

Apparatus and system embodying the invention are hereinafter described, by way of example, with reference to the accompanying drawings.

DESCRIPTION OF THE PREFERRED EMBODIMENTS

Figure 1:
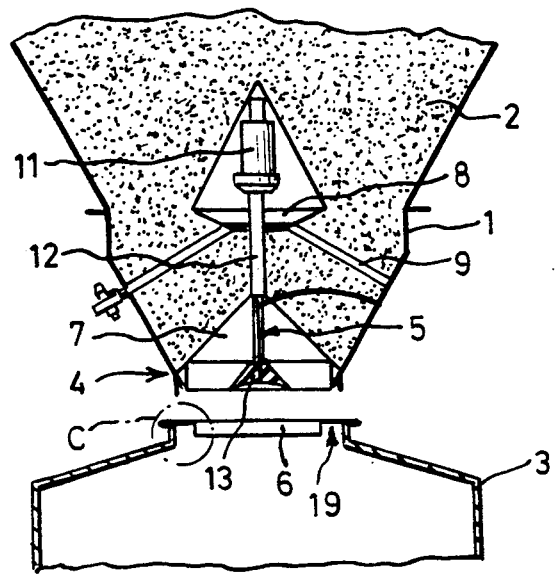
FIG. 1 shows apparatus comprising a container such as a silo embodying the invention with a receptacle such as an I.B.C. therebelow, a closure or lid of a charging opening of the receptacle being in position to close the opening.

Referring to the drawings, there is shown apparatus comprising a container 1, such as a silo or hopper for storing and distributing flowable material 2, to receptacle 3 such as an I.B.C. via an outlet 4, there being a device 5 adapted for removing and replacing a closure 6 of the receptacle 3, particularly on passage of material into the receptacle 3.

The outlet 4 of the silo is normally obturated by a conical (or frusto-conical) closure device 7 which is raised and lowered by pneumatic means in the form of an air bellows 8 mounted in the silo on a frame 9. The bellows 8 is within a cone 10, and there is also means for oscillating the cone, such as a vibrator 11, in order to obviate bridging or rat-holing of material during discharge. The bellows 8 is housed within a hygienic cover for cleanliness. The cone 7 is connected with the bellows via a connector means 12 which in the illustrated embodiment is in the form of a telescopic tube. The tube 12 passes through the apex of the cone 7 and is secured thereat as by a nut and bolt arrangement. The tube 12 passes down interiorly of the cone and terminates in a suction cup 13 such as a rubber cup, the cup 13 itself being generally conical and its periphery being generally in a plane which also contains the periphery of the cone 7. There is a vacuum line 14 connecting the interior of the tube 12, and hence the interior of the cup 13, with suction means (not shown).

Figure 8:
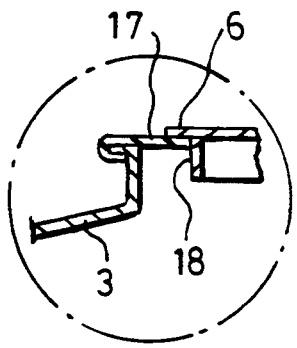
FIG. 8 is an enlargement of detail 'C' of FIG. 1.

The outlet 4 of the silo 1 is normally closed by the cone 7, and by seal means 15 in the form of a flexible, resilient lip seal which normally, in the closed position of the cone 7, butts against a depending skirt means 16, of the cone 7. Similarly, the lid 6 of the receptacle 3 has a seal means in the form of an annular flexible, resilient lip seal 17 which normally, in the closed position of the lid 6, butts up against the underside of the lid and a depending wall 18 of the lid (FIG. 8).

In use to transfer powder from the silo 1 to the I.B.C. 3, the I.B.C. 3 is positioned below the outlet 4, the cone 7 being in a lowered (as viewed) closing position to obturate the outlet 4. The seal 15 ensures that no powder escapes and contaminates surrounding environment or external surfaces of the silo.

Figure 2:
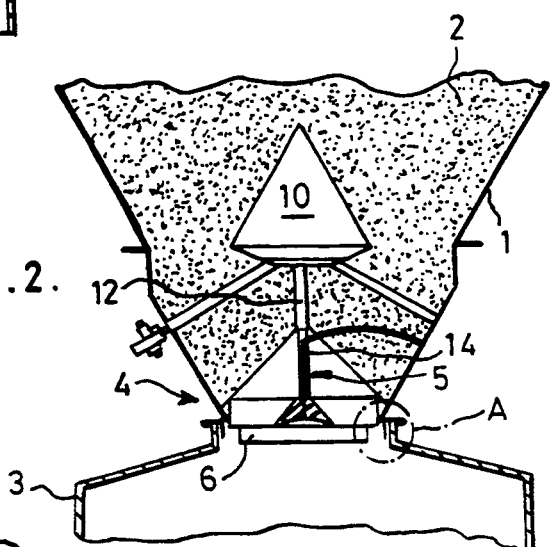
FIG. 2 shows the receptacle lifted to be in engagement with a discharge opening of the silo.
Figure 3:
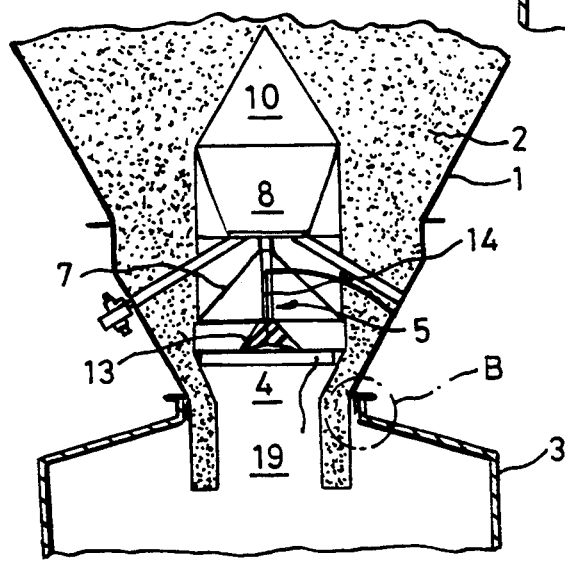
FIG. 3 shows operation to charge the receptacle with material from the silo.
Figure 6:
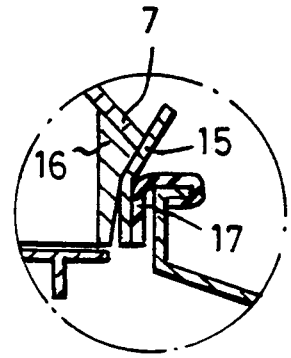
FIG. 6 shows an enlargement of detail 'A' of FIG. 2.
Figure 5:
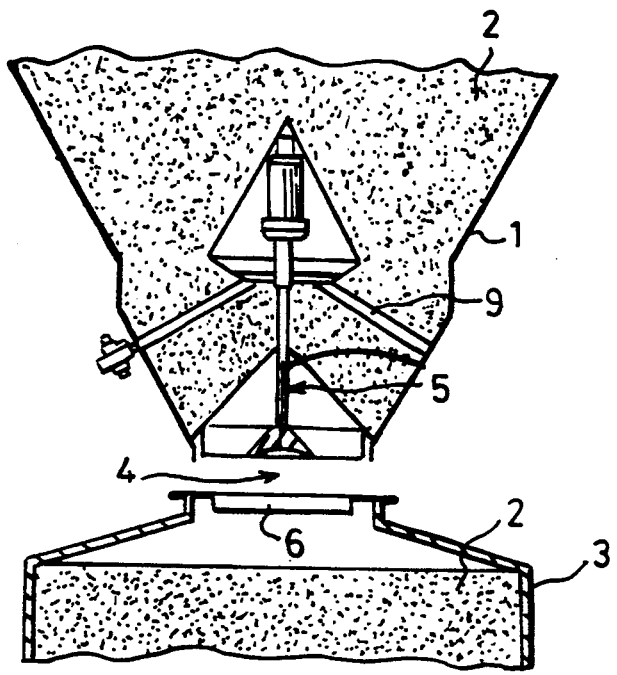
FIG. 5 shows a stage after the I.B.C. is removed, and is similar to FIG. 1.

The I.B.C. 3, is then raised by suitable means (not shown) so that the outlet 4 and charging aperture 19 interengage with the suction device 13 being received on the lid 6. (upper surface thereof as viewed, FIG. 2). In engaging the outlet aperture 4 with the charging aperture 19, the respective lip seals 15, 17 engage as shown in FIG. 6, with the normally outer surfaces in light engagement. The suction means is switched on, usually automatically by sensors which sense full engagement of the outlet and charging aperture, and this results in a suction being applied to the lid 6 via the suction device 13. The bellows 8 is then actuated to raise the cone 7 clear of the outlet 4 to leave an annular area therearound.

Figure 4:
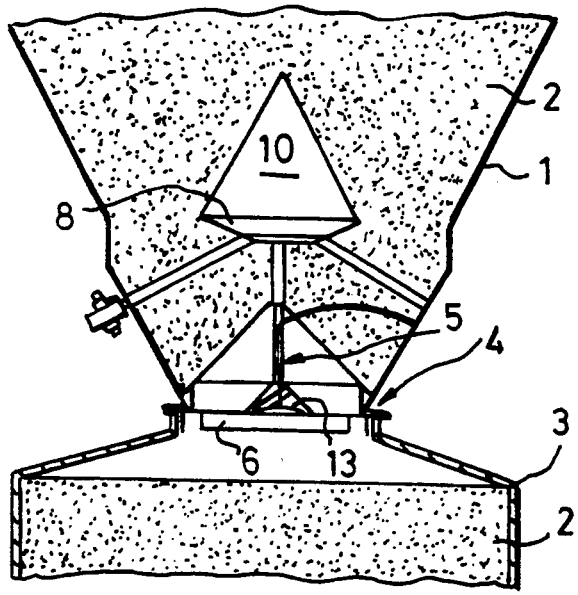
FIG. 4 shows a stage after charging has been completed.
Figure 7:
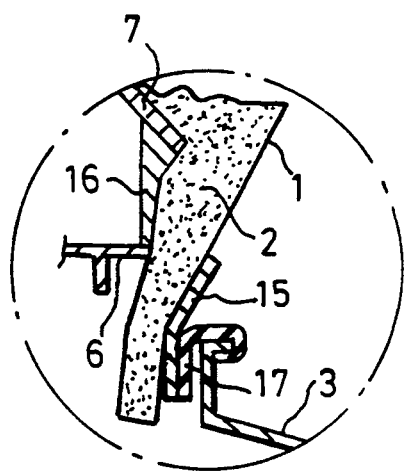
FIG. 7 shows an enlargement of detail 'B' of FIG. 3.

This raising action results in the effective shortening of the tube 12 and this in turn raises the suction pad 13. This action therefore raises the lid 6 clear of the charging aperture 19 so that material 2 flows from the silo 1, past the cone 7 through the annular area, past the lid 6 and into the I.B.C. 3, the material passing inward from the cooperating seals (FIG. 7). When a required amount of material has passed into the I.B.C., the bellows 8 is actuated to lower the cone 7, so obturating the outlet 4. This action also lowers the lid 6, but to a level (about 5 cms) below the closing level, FIG. 4. The suction device 13 is then raised about 5 cms to bring the lid 6 to the required closing position, and the I.B.C. is then disengaged from the outlet 4, by movement vertically downwards away therefrom, which action separate the lip seals 15, 17, which return to their sealing positions respectively against the cone 7 and lid 6. Because the outer surfaces of the lip seals are tightly packed together during filling, they are not contaminated with material 2 so that the apparatus and the environment remains uncontaminated throughout the discharge operation.

It will be understood that the apparatus described hereinbefore may be modified. For example the device may be mountable on the I.B.C.. Further, the device may be mounted in a chute or body having an upper part and a lower part which are sealingly connected to allow relative rotation about a central, longitudinal axis that is the axis which in use is aligned with the longitudinal axis of the hopper or silo and I.B.C.. The sealing connection of the two parts is to allow relative rotation whilst obviating leakage of material from the chute during transfer.

Each free end of the chute may have a part of a rotational or bayonet-kind of connection with a complementary part of a rotational or bayonet-kind of connection respectively at the outlet of the hopper or silo and at the lid of I.B.C.. In use, the chute, which is interposed between the outlet of the hopper or silo and the lid of the I.B.C. is offered up to say the hopper or silo so that the complementary connection parts are aligned and engaged.

The upper part of the chute is then rotated, and the complementary parts of the upper connection are thus securely locked together in sealing engagement. The I.B.C. (or other piece of apparatus such as a process vessel such as a dryer or blender, portable station, storage bin or the like), is then offered up to the bottom (in use) end of the chute so that the connection parts are aligned and engaged. The lower part of the chute is then rotated, and the complementary parts of the lower connection are thus securely locked together in sealing engagement.

A probe device as described in relation to the first embodiment then operates in a similar way to raise the cone valve of the hopper or silo and to raise the lid of the I.B.C., which lid is connected to the connection part of the I.B.C. and is thus now connected with the chute. The whole lower connector part of the chute and the lid is raised by the lower probe. The closing sequence is a reverse of the opening sequence described.

It will also be understood that in a further modification the chute may not be separate, it may be an integral part, or a fixture with, the outlet of the hopper or silo, or an inlet of a receptacle such as a fixed station, where for example the I.B.C. stands in the stead of the hopper or silo, and discharges its contents to the fixed station where the system is such that the I.B.C. delivers to a reactor of which the fixed station is a part.

In all embodiments, the systems hereinbefore described allow transfer of bulk materials such as powder of granules from vessel to vessel without the need to provide bulky, messy and labour intensive manual transfer valves using glove box enclosures, and moreover allow such transfer to be effected in vessels which are portable and/or required to rotate, and which do not have a lid, only a discharge during opening.

I claim:

1. Apparatus for transferring a flowable material to a receptacle, comprising:
   a container for the flowable material, said container having an outlet and means for obturating said outlet; and
   means carried by said container for applying suction to a removable closure of the receptacle and for removing and replacing the closure under suction to open and close the receptacle.

2. Apparatus according to claim 1, wherein said obturating means includes a displaceable closure member and said suction applying means is displaceable with said closure member.

3. Apparatus according to claim 2, wherein said suction applying means is secured to said closure member.

4. Apparatus according to claim 1, wherein said suction applying means is disposed internally of said obturating means.

5. Apparatus according to claim 1, wherein said obturating means includes displaceable cone means for opening and closing said outlet and said suction applying means is disposed internally of said cone means.

6. Apparatus according to claim 5, wherein said suction applying means is displaceable with said cone means.

7. Apparatus according to claim 6, wherein said suction applying means is secured to said cone means.

8. Apparatus according to claim 5, including actuating means for reciprocating said cone means.

9. Apparatus according to claim 8, wherein said actuating means includes pneumatic lifting means connected to said cone means.

10. Apparatus according to claim 8, wherein said actuating means includes bellows means connected to said cone means.

11. Apparatus according to claim 8, wherein said suction applying means is secured to said actuating means.

12. Apparatus according to claim 11, wherein said actuating means includes a telescoping member connected to said cone means and said suction applying means is attached to said telescoping member.

13. Apparatus according to claim 12, wherein said suction applying means includes a suction member attached to an extension of said telescoping member and said extension carries means for connecting said suction member to a vacuum source.

14. A flowable-material transfer system, comprising:
 a container for the flowable material, said container having an outlet and means for obturating said outlet;
 a receptacle having an inlet cooperable with said outlet of said container for receiving the material from said container, and a removable closure for said inlet; and
 means carried by said container for applying suction to said closure and removing and replacing said closure under suction to open and close said inlet of the receptacle.

15. A system according to claim 14, wherein said obturating means includes a displaceable closure member and said suction applying means is displaceable with said closure member.

16. A system according to claim 15, wherein said suction applying means is secured to said closure member.

17. A system according to claim 14, wherein said suction applying means is disposed internally of said obturating means.

18. A system according to claim 14, wherein said obturating means includes displaceable cone means for opening and closing said outlet and said suction applying means is disposed internally of said cone means.

19. A system according to claim 18, wherein said suction applying means is displaceable with said cone means.

20. A system according to claim 19, wherein said suction applying means is secured to said cone means.

21. A system according to claim 18, including actuating means for reciprocating said cone means.

22. A system according to claim 21, wherein said actuating means includes pneumatic lifting means connected to said cone means.

23. A system according to claim 21, wherein said actuating means includes bellows means connected to said cone means.

24. A system according to claim 21, wherein said suction applying means is secured to said actuating means.

25. A system according to claim 24, wherein said actuating means includes a telescoping member connected to said cone means and said suction applying means is attached to said telescoping member.

26. A system according to claim 25, wherein said suction applying means includes a suction member attached to an extension of said telescoping member and said extension carries means for connecting said suction member to a vacuum source.

27. A system according to claim 14, wherein said container and said receptacle have cooperable seal means near said outlet and said inlet for preventing contamination of exterior surfaces of said container and said receptacle by the material.

* * * * *